United States Patent
Akiyama et al.

(10) Patent No.: US 7,720,383 B2
(45) Date of Patent: May 18, 2010

(54) OPTICAL TRANSMISSION APPARATUS HAVING OADM FUNCTION

(75) Inventors: Yuichi Akiyama, Kawasaki (JP); Takafumi Terahara, Kawasaki (JP); Hiroki Ooi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 648 days.

(21) Appl. No.: 11/651,599

(22) Filed: Jan. 10, 2007

(65) Prior Publication Data

US 2008/0056715 A1    Mar. 6, 2008

(30) Foreign Application Priority Data

Aug. 30, 2006    (JP) .............................. 2006-233401

(51) Int. Cl.
*H04J 14/02* (2006.01)
(52) U.S. Cl. .......................................... 398/83; 398/49
(58) Field of Classification Search ............. 398/48–50, 398/83
See application file for complete search history.

(56) References Cited

U.S. PATENT DOCUMENTS

2006/0034610 A1* 2/2006 Akiyama et al. .............. 398/83
2006/0098981 A1 5/2006 Miura et al.
2007/0269211 A1* 11/2007 Doerr et al. .................... 398/49
2007/0286605 A1* 12/2007 Feuer et al. .................... 398/83

FOREIGN PATENT DOCUMENTS

JP    2006-87062    3/2006
JP    2006-140598    6/2006

* cited by examiner

*Primary Examiner*—Nathan M Curs
(74) *Attorney, Agent, or Firm*—Fujitsu Patent Center

(57) ABSTRACT

An optical transmission apparatus has a first wavelength selective switch (WSS) for route switching, provided with respect to each route, to selectively output signal light from a first input route to second through Nth output routes and to selectively output signal lights from second through Nth input routes to a first output route, for every wavelength, a second WSS for add and drop, to selectively output a signal light from an add port to the first through Nth output routes via the first WSS for every wavelength, and to selectively output the signal lights from the first through Nth input routes to a drop port via the first WSS for every wavelength, and an optical coupler to multiplex each of the signal lights output from the first WSS to the output routes and each of the signal lights output from the second WSS to the output routes, for every route, and to send multiplexed signal light to a first WSS of an other route, and to branch and supply multiplexed signal light input from said other route to the first WSS and the second WSS. The signal lights input and output by the first WSS and the second WSS are transmitted bidirectionally within a single optical transmission line.

5 Claims, 9 Drawing Sheets

| ADD&DROP FUNCTIONS<br>ROUTE SWITCHING FUNCTION | A#1→R#1<br>R#1→D#1 | A#1→R#2<br>R#2→D#1 | A#1→R#3<br>R#3→D#1 | A#1→R#4<br>R#4→D#1 |
|---|---|---|---|---|
| R#1→R#2 | △ | △ | ○ | ○ |
| R#1→R#3 | △ | ○ | △ | ○ |
| R#1→R#4 | △ | ○ | ○ | △ |

FIG.8

| ADD&DROP FUNCTIONS<br>ROUTE SWITCHING FUNCTION | A#1→R#1<br>R#1→D#1 | A#1→R#2<br>R#2→D#1 | A#1→R#3<br>R#3→D#1 | A#1→R#4<br>R#4→D#1 |
|---|---|---|---|---|
| R#1→R#2 | △ | △ | ○ | ○ |
| R#1→R#3 | △ | ○ | △ | ○ |
| R#1→R#4 | △ | ○ | ○ | △ |

FIG.9

| ROUTE SWITCHING FUNCTION \ ADD FUNCTION | A#1→R#1 | A#1→R#2 | A#1→R#3 | A#1→R#4 |
|---|---|---|---|---|
| R#1→R#2 | △ | △ | ○ | ○ |
| R#1→R#3 | △ | ○ | △ | ○ |
| R#1→R#4 | △ | ○ | ○ | △ |

FIG.10

| ROUTE SWITCHING FUNCTION \ DROP FUNCTION | R#1→D#1 | R#2→D#1 | R#3→D#1 | R#4→D#1 |
|---|---|---|---|---|
| R#1→R#2 | △ | △ | ○ | ○ |
| R#1→R#3 | △ | ○ | △ | ○ |
| R#1→R#4 | △ | ○ | ○ | △ |

FIG.11

| ROUTE SWITCHING FUNCTION / ADD FUNCTION | A#1→R#1 | A#1→R#2 | A#1→R#3 | A#1→R#4 |
|---|---|---|---|---|
| R#1→R#2 | △ | △ | ○ | ○ |
| R#1→R#3 | △ | ○ | △ | ○ |
| R#1→R#4 | △ | ○ | ○ | △ |

FIG.12

| ROUTE SWITCHING FUNCTION / DROP FUNCTION | R#1→D#1 | R#2→D#1 | R#3→D#1 | R#4→D#1 |
|---|---|---|---|---|
| R#1→R#2 | △ | ○ | ○ | ○ |
| R#1→R#3 | △ | ○ | ○ | ○ |
| R#1→R#4 | △ | ○ | ○ | ○ |

OPTICAL TRANSMISSION APPARATUS HAVING OADM FUNCTION

BACKGROUND OF THE INVENTION

1. Field of the Invention

The present invention generally relates to optical transmission apparatuses, and more particularly to an optical transmission apparatus that is for a wavelength division multiplex (WDM) optical transmission system, and is provided with a wavelength cross-connect (WXC) function and an optical add and drop multiplexing (OADM) function.

2. Description of the Related Art

The WDM optical transmission system is used in a trunk optical network that connects nodes, formed by optical transmission apparatuses set up in a city or the like, via optical transmission lines, and exchanges WDM signal light. The WXC function of the WDM optical transmission system switches an output destination route of signal light input from each route for every wavelength, and sends the signal light to a predetermined route. The OADM function of the WDM optical transmission system adds and sends signal light having an arbitrary wavelength to an arbitrary route, and drops and receives the signal light having the arbitrary wavelength from the arbitrary route. With respect to the WDM optical transmission system, there are demands to enable easy expansion of the system and to enable system construction at a low cost.

In a case where a transmission fault is generated between the nodes of the trunk optical network, there are demands to realize a function that instantaneously switches the transmission route between the nodes to an alternative route and instantaneously switches the signal light to a signal light having a wavelength usable in the alternative route. In order to realize this function, there is active research and development of devices that can form a route switching means, such as a wavelength selective switch (WSS) that can switch and output input signal light having an arbitrary wavelength to an arbitrary route, and a wavelength blocker that can block signal light having an arbitrary wavelength from passing through from among input WDM signal light, to be used in place of an optical matrix switch having a number of input ports equal to a product of the number of input routes and the number of wavelengths and having a number of output ports equal to a product of the number of output routes and the number of wavelengths.

Figure 1:
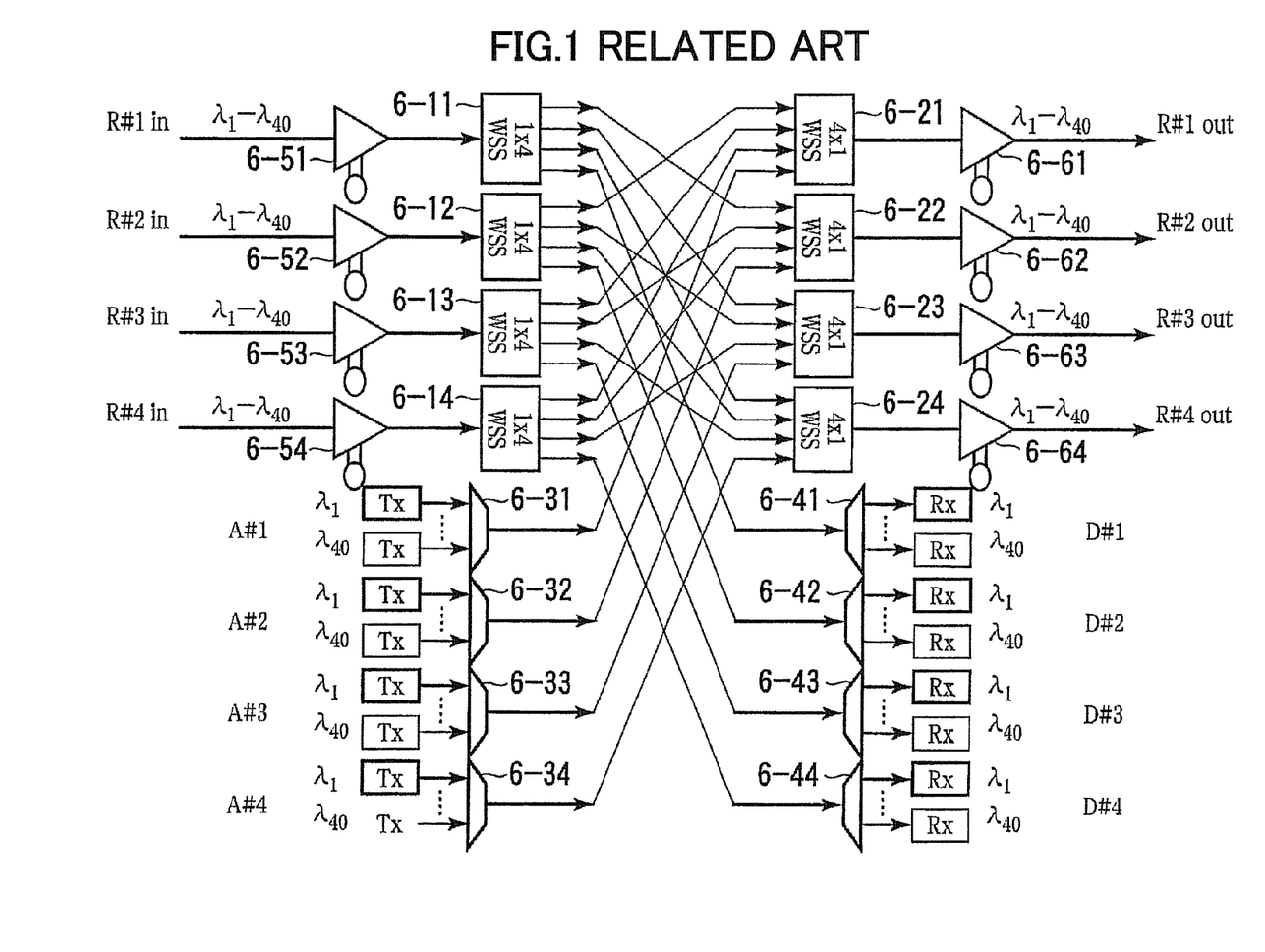
FIG. 1 is a system block diagram showing a structure of an example of a conventional optical transmission apparatus applied with the WSS.

FIG. 1 is a system block diagram showing a structure of an example of a conventional optical transmission apparatus applied with the WSS. FIG. 1 shows a case where the number of routes is 4, and the number of wavelengths (that is, channels) of the signal light is 40. As shown in FIG. 1, the optical transmission apparatus has, in a core portion thereof, first through fourth input wavelength selective switches (1×4 WSSs) 6-11 through 6-14 having 1 input port and 4 output ports, and first through fourth output wavelength selective switches (4×1 WSSs) 6-21 through 6-24 having 4 input ports and 1 output port.

The signal light from a first route R#1 is input to the input port of the first input wavelength selective switch (1×4 WSS) 6-11, and the signal lights from the output ports of the first input wavelength selective switch (1×4 WSS) 6-11 are output to the input ports of the output wavelength selective switches (4×1 WSSs) 6-22, 6-23 and 6-24 for the routes R#2, R#3 and R#4, other than the route R#1, and to an optical demultiplexer 6-41 of a first signal drop port D#1.

Similarly, the signal light from the second route R#2 is input to the input port of the second input wavelength selective switch (1×4 WSS) 6-12, and the signal lights from the output ports of the second input wavelength selective switch (1×4 WSS) 6-12 are output to the input ports of the output wavelength selective switches (4×1 WSSs) 6-21, 6-23 and 6-24 for routes R#1, R#3 and R#4, other than the route R#2, and to an optical demultiplexer 6-42 of a second signal drop port D#2.

Similarly, the signal light from the third route R#3 is input to the input port of the third input wavelength selective switch (1×4 WSS) 6-13, and the signal lights from the output ports of the third input wavelength selective switch (1×4 WSS) 6-13 are output to the input ports of the output wavelength selective switches (4×1 WSSs) 6-21, 6-22 and 6-24 for routes R#1, R#2 and R#4, other than the route R#3, and to an optical demultiplexer 6-43 of a third signal drop port D#3.

Similarly, the signal light from the fourth route R#4 is input to the input port of the fourth input wavelength selective switch (1×4 WSS) 6-14, and the signal lights from the output ports of the fourth input wavelength selective switch (1×4 WSS) 6-14 are output to the input ports of the output wavelength selective switches (4×1 WSSs) 6-21, 6-22 and 6-23 for routes R#1, R#2 and R#3, other than the route R#4, and to an optical demultiplexer 6-44 of a fourth signal drop port D#4.

On the other hand, the input ports of the first output wavelength selective switch (4×1 WSS) 6-21 receives the signal lights from the output ports of the input wavelength selective switches (1×4 WSSs) 6-12, 6-13 and 6-14 for the routes R#2, R#3 and R#4, other than the route R#1, and the signal light from an optical multiplexer 6-31 of a first signal add port A#1.

Similarly, the input ports of the second output wavelength selective switch (4×1 WSS) 6-22 receives the signal lights from the output ports of the input wavelength selective switches (1×4 WSSs) 6-11, 6-13 and 6-14 for the routes R#1, R#3 and R#4, other than the route R#2, and the signal light from an optical multiplexer 6-32 of a second signal add port A#2.

Similarly, the input ports of the third output wavelength selective switch (4×1 WSS) 6-23 receives the signal lights from the output ports of the input wavelength selective switches (1×4 WSSs) 6-11, 6-12 and 6-14 for the routes R#1, R#2 and R#4, other than the route R#3, and the signal light from an optical multiplexer 6-33 of a third signal add port A#3.

Similarly, the input ports of the fourth output wavelength selective switch (4×1 WSS) 6-24 receives the signal lights from the output ports of the input wavelength selective switches (1×4 WSSs) 6-11, 6-12 and 6-13 for the routes R#1, R#2 and R#3, other than the route R#4, and the signal light from an optical multiplexer 6-34 of a fourth signal add port A#4.

According to the structure shown in FIG. 1, the output route to which the signal light is added is fixed for each of the first through fourth signal add ports A#1 through A#4. In other words, the first signal add port A#1 can only add the signal light to the output route R#1, and the second signal add port A#2 can only add the signal light to the output route R#2. Similarly, the third signal add port A#3 can only add the signal light to the output route R#3, and the fourth signal add port A#4 can only add the signal light to the output route R#4.

In addition, the input route from which the signal light is dropped is fixed for each of the first through fourth signal drop ports D#1 through D#4. In other words, the first signal drop port D#1 can only drop the signal light from the optical route R#1, and the second signal drop port D#2 can only drop the signal light from the optical route R#2. Similarly, the third signal drop port D#3 can only drop the signal light from the optical route R#3, and the fourth signal drop port D#4 can only drop the signal light from the optical route R#4.

For this reason, each of the first through fourth signal add ports A#1 through A#4 cannot add and send the signal light to an arbitrary output route, and each of the first through fourth signal drop ports D#1 through D#4 cannot drop and receive the signal light from an arbitrary input route. In other words, it is not possible to realize the OADM function with respect to arbitrary routes by an arbitrary signal add port and an arbitrary signal drop port.

Moreover, according to the structure shown in FIG. 1, each of the signal add ports A#1 through A#4 uses 40 transmitters TX for sending the signal lights having the fixed wavelengths of $\lambda_1$ through $\lambda_{40}$, and the outputs of the transmitters TX corresponding to the wavelengths of the signal lights to be added are multiplexed by the optical multiplexers 6-31 through 6-34. Furthermore, each of the signal drop ports D#1 through D#4 uses 40 receivers RX for receiving the signal lights having the fixed wavelengths of $\lambda_1$ through $\lambda_{40}$, and the signal lights are branched by the optical demultiplexers 6-41 through 6-44 and received by the receivers RX. It is thus necessary to provide expensive WDM optical amplifiers 6-51 through 6-54 and 6-61 through 6-64, in order to compensate for the large losses at the optical multiplexers 6-31 through 6-34 and the optical demultiplexers 6-41 through 6-44.

A Japanese Laid-Open Patent Application No. 2006-140598, having a corresponding U.S. patent application Publication No. US2006/0098981, proposes an optical transmission apparatus which uses a wavelength selective switch in the signal add port and the signal drop port of the structure shown in FIG. 1, so as to enable adding and dropping of the signal light having an arbitrary wavelength with respect to an arbitrary route. According to this proposal, multiplexers are used in place of the output wavelength selective switches (4×1 WSSs) 6-21 through 6-24 shown in FIG. 1.

In addition, a Japanese Laid-Open Patent Application No. 2006-87062, having a corresponding U.S. patent application Publication No. US2006/0034610, proposes an optical add and drop apparatus which has a through route for passing the input light from the input port to the output port, a drop output port for dropping the input light having a predetermined wavelength, and an add output port for adding the signal light having a predetermined wavelength to the input light. According to this proposal, it is possible to easily expand the number of wavelengths and expand easily expand the wavelength cross-connect function, and to add and drop the signal lights without breaking the transmission signal.

Figure 2:
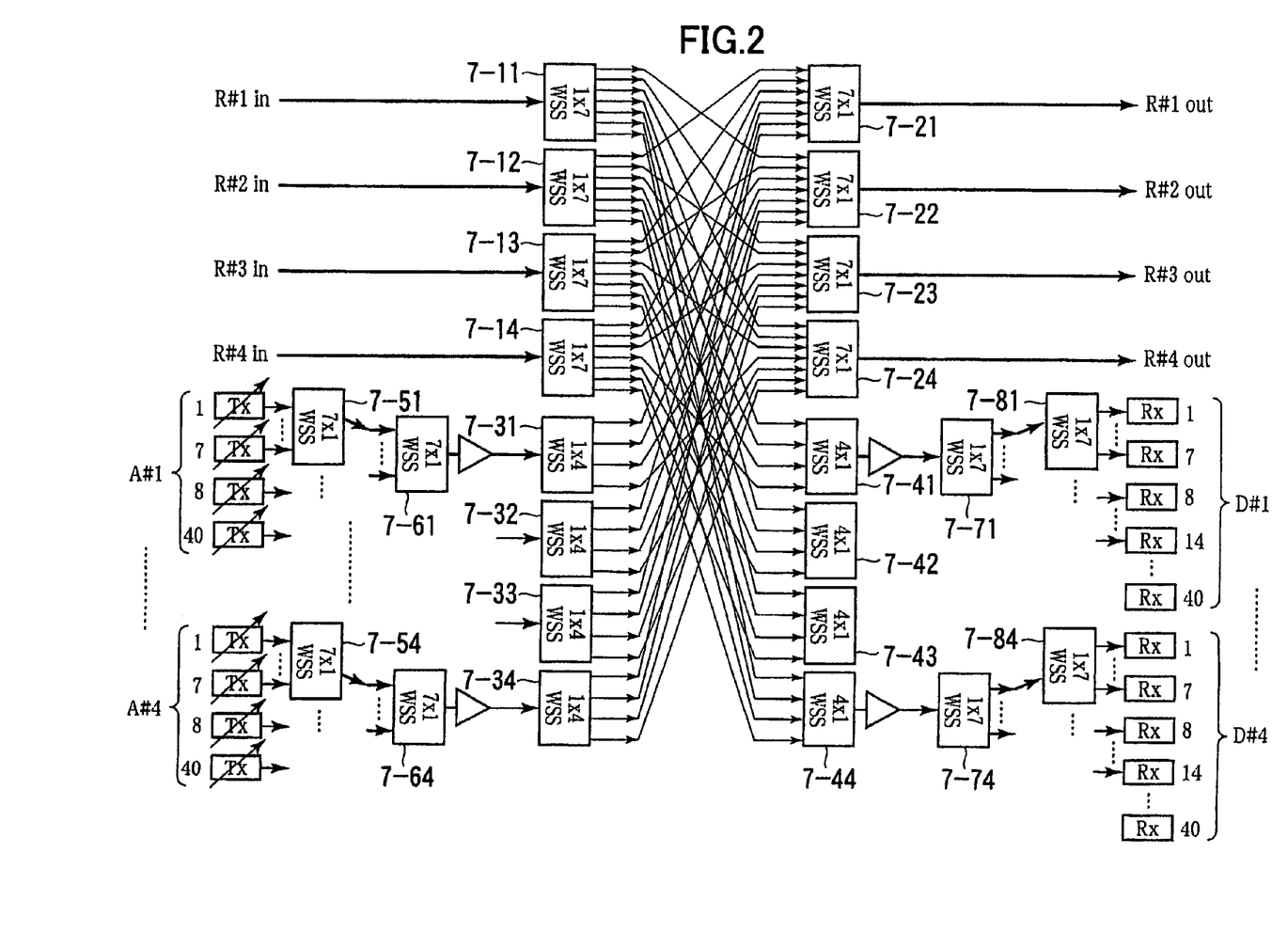
FIG. 2 is a system block diagram showing a structure of an example of a conceivable optical transmission apparatus.

FIG. 2 is a system block diagram showing a structure of an example of a conceivable optical transmission apparatus. This second example shown in FIG. 2 uses the wavelength selective switch in the signal add port and the signal drop port of the structure shown in FIG. 1, and the input wavelength selective switch and the output wavelength selective switch for each of the routes, so that it is possible to switch the route of and to drop or add the signal light having an arbitrary wavelength with respect to an arbitrary route.

FIG. 2 shows a case where the number of routes is 4, and the number of wavelengths (that is, channels) of the signal light is 40, similarly to the case shown in FIG. 1. As shown in FIG. 2, the optical transmission apparatus has, in a core portion thereof, first through fourth input wavelength selective switches (1×7 WSSs) 7-11 through 7-14 having 1 input port and 7 output ports, and first through fourth output wavelength selective switches (7×1 WSSs) 7-21 through 7-24 having 7 input ports and 1 output port.

The signal light from the first route R#1 is input to the input port of the first input wavelength selective switch (1×7 WSS) 7-11, and the signal lights from the output ports of the first input wavelength selective switch (1×7 WSS) 7-11 are output to the input ports of the output wavelength selective switches (7×1 WSSs) 7-22, 7-23 and 7-24 for the routes R#2, R#3 and R#4, other than the route R#1, and to wavelength selective switches (4×1 WSSs) 7-41 through 7-44 of first through fourth signal drop ports D#1 through D#4.

Similarly, the signal light from the second route R#2 is input to the input port of the second input wavelength selective switch (1×7 WSS) 7-12, and the signal lights from the output ports of the second input wavelength selective switch (1×7 WSS) 7-12 are output to the input ports of the output wavelength selective switches (7×1 WSSs) 7-21, 7-23 and 7-24 for routes R#1, R#3 and R#4, other than the route R#2, and to the wavelength selective switches (4×1 WSSs) 7-41 through 7-44 of the first through fourth signal drop ports D#1 through D#4.

Similarly, the signal light from the third route R#3 is input to the input port of the third input wavelength selective switch (1×7 WSS) 7-13, and the signal lights from the output ports of the third input wavelength selective switch (1×7 WSS) 7-13 are output to the input ports of the output wavelength selective switches (7×1 WSSs) 7-21, 7-22 and 7-24 for routes R#1, R#2 and R#4, other than the route R#3, and to the wavelength selective switches (4×1 WSSs) 7-41 through 7-44 of the first through fourth signal drop ports D#1 through D#4.

Similarly, the signal light from the fourth route R#4 is input to the input port of the fourth input wavelength selective switch (1×7 WSS) 7-14, and the signal lights from the output ports of the fourth input wavelength selective switch (1×7 WSS) 7-14 are output to the input ports of the output wavelength selective switches (7×1 WSSs) 7-21, 7-22 and 7-23 for routes R#1, R#2 and R#3, other than the route R#4, and to the wavelength selective switches (4×1 WSSs) 7-41 through 7-44 of the first through fourth signal drop ports D#1 through D#4.

On the other hand, the input ports of the first output wavelength selective switch (7×1 WSS) 7-21 receives the signal lights from the output ports of the input wavelength selective switches (1×7 WSSs) 7-12, 7-13 and 7-14 for the routes R#2, R#3 and R#4, other than the route R#1, and the signal lights from the wavelength selective switches (1×4 WSSs) 7-31 through 7-34 of the first through fourth signal add ports A#1 through A#4.

Similarly, the input ports of the second output wavelength selective switch (7×1 WSS) 7-22 receives the signal lights from the output ports of the input wavelength selective switches (1×7 WSSs) 7-11, 7-13 and 7-14 for the routes R#1, R#3 and R#4, other than the route R#2, and the signal lights from the signal lights from the wavelength selective switches (1×4 WSSs) 7-31 through 7-34 of the first through fourth signal add ports A#1 through A#4.

Similarly, the input ports of the third output wavelength selective switch (7×1 WSS) 7-23 receives the signal lights from the output ports of the input wavelength selective switches (1×7 WSSs) 7-11, 7-12 and 7-14 for the routes R#1, R#2 and R#4, other than the route R#3, and the signal lights from the wavelength selective switches (1×4 WSSs) 7-31 through 7-34 of the first through fourth signal add ports A#1 through A#4.

Similarly, the input ports of the fourth output wavelength selective switch (7×1 WSS) 7-24 receives the signal lights from the output ports of the input wavelength selective switches (1×7 WSSs) 7-11, 7-12 and 7-13 for the routes R#1, R#2 and R#3, other than the route R#4, and the signal lights from the wavelength selective switches (1×4 WSSs) 7-31 through 7-34 of the first through fourth signal add ports A#1 through A#4.

The first signal add port A#1 has 40 variable wavelength transmitters TX for sending signal lights having 40 different wavelengths, a 2-stage switch, made up of wavelength selective switches (7×1 WSSs) 7-51 and 7-61, for selectively inputting the signal light from the variable wavelength transmitters TX, and a wavelength selective switch (1×4 WSS) 7-31. The second signal add port A#2 has 40 variable wavelength transmitters TX for sending signal lights having 40 different wavelengths, a 2-stage switch, made up of wavelength selective switches (7×1 WSSs) 7-52 and 7-62, for selectively inputting the signal light from the variable wavelength transmitters TX, and a wavelength selective switch (1×4 WSS) 7-32. The third signal add port A#3 has 40 variable wavelength transmitters TX for sending signal lights having 40 different wavelengths, a 2-stage switch, made up of wavelength selective switches (7×1 WSSs) 7-53 and 7-63, for selectively inputting the signal light from the variable wavelength transmitters TX, and a wavelength selective switch (1×4 WSS) 7-33. The fourth signal add port A#4 has 40 variable wavelength transmitters TX for sending signal lights having 40 different wavelengths, a 2-stage switch, made up of wavelength selective switches (7×1 WSSs) 7-54 and 7-64, for selectively inputting the signal light from the variable wavelength transmitters TX, and a wavelength selective switch (1×4 WSS) 7-34.

In addition, the first signal drop port D#1 has a wavelength selective switch (4×1 WSS) 7-41, a 2-stage switch, made up of wavelength selective switches (1×7 WSSs) 7-71 and 7-81, and 40 receivers RX for receiving signal lights having 40 different wavelengths. The second signal drop port D#2 has a wavelength selective switch (4×1 WSS) 7-42, a 2-stage switch, made up of wavelength selective switches (1×7 WSSs) 7-72 and 7-82, and 40 receivers RX for receiving signal lights having 40 different wavelengths. The third signal drop port D#3 has a wavelength selective switch (4×1 WSS) 7-43, a 2-stage switch, made up of wavelength selective switches (1×7 WSSs) 7-73 and 7-83, and 40 receivers RX for receiving signal lights having 40 different wavelengths. The fourth signal drop port D#4 has a wavelength selective switch (4×1 WSS) 7-44, a 2-stage switch, made up of wavelength selective switches (1×7 WSSs) 7-74 and 7-84, and 40 receivers RX for receiving signal lights having 40 different wavelengths.

Each of the first through fourth signal add ports A#1 through A#4 can arbitrarily select the output route to which the signal light is to be added, from each of output routes R#1out, R#2out, R#3out and R#4out. In addition each of the first through fourth signal drop ports D#1 through D#4 can arbitrarily select the input route from which the signal light is to be dropped, from each of input routes R#1in, R#2in, R#3in and R#4in.

In the optical transmission apparatus shown in FIG. 2, when the number of routes is increased or decreased, the number of wavelength selective switches (WSSs) 7-11 through 7-14 and 7-21 through 7-24 corresponding to each route must be increased or decreased, and the number of ports of the wavelength selective switches (WSSs) 7-11 through 7-14 and 7-21 through 7-24 corresponding to each route, the wavelength selective switches (WSSs) 7-31 through 7-34 in each signal add port and the wavelength selective switches (WSSs) 7-41 through 7-44 in each signal drop port must be increased or decreased.

In addition, when the number of wavelengths (that is, channels) is increased or decreased, the number of ports of the wavelength selective switches (7×1 WSSs) 7-51 through 7-54 and 7-61 through 7-64 for selecting the signal lights from the transmitters TX of the signal add ports A#1 through A#4 and outputting the selected signal lights to the input ports of the wavelength selective switches (1×4 WSSs) 7-31 through 7-34 must be increased or decreased, and the number of ports of the wavelength selective switches (1×7 WSSs) 7-71 through 7-74 and 7-81 through 7-84 for selecting the signal lights from the output ports of the wavelength selective switches (4×1 WSSs) 7-41 through 7-44 and outputting the selected signal lights to the receivers RX of the signal drop ports D#1 through D#4.

Therefore, according to the structure shown in FIG. 2, it is possible to add the signal light having an arbitrary wavelength with respect to an arbitrary signal add port and to drop the signal light having an arbitrary wavelength from an arbitrary signal drop port, but compared to the structure shown in FIG. 1, there were problems in that the number of required wavelength selective switches (WSSs) and the number of ports thereof increase considerably, that the number of wirings which couple the wavelength selective switches (WSSs) increases in a geometric series, and that the cost and the scale of the optical transmission apparatus increase.

SUMMARY OF THE INVENTION

Accordingly, it is a general object of the present invention to provide a novel and useful optical transmission apparatus in which the problems described above are suppressed.

Another and more specific object of the present invention is to provide an optical transmission apparatus which can add signal light having an arbitrary wavelength with respect to an arbitrary signal add port and drop signal light having an arbitrary wavelength from an arbitrary signal drop port, using a considerably reduced number of expensive wavelength selective switches (WSSs) and considerably reduced number of wirings for coupling the wavelength selective switches (WSSs), so as to enable the structure and size of the optical transmission apparatus to be simplified and reduced, respectively, while enabling to easily cope with an increase or decrease of the number of routes and an increase or decrease of the number of wavelengths (that is, channels).

Still another object of the present invention is to provide an optical transmission apparatus comprising a first wavelength selective switch for route switching, provided with respect to each route, and configured to selectively output signal light from a first input route to second through Nth output routes and to selectively output signal lights from second through Nth input routes to a first output route, for every wavelength; a second wavelength selective switch for add and drop, configured to selectively output a signal light from an add port to the first through Nth output routes via the first wavelength selective switch for every wavelength, and to selectively output the signal lights from the first through Nth input routes to a drop port via the first wavelength selective switch for every wavelength; and an optical coupler configured to multiplex each of the signal lights output from the first wavelength selective switch to the output routes and each of the signal lights output from the second wavelength selective switch to the output routes, for every route, and to send multiplexed signal light to a first wavelength selective switch of an other route, and to branch and supply multiplexed signal light input from said other route to the first wavelength selective switch and the second wavelength selective switch, wherein the signal lights input and output by the first wavelength selective switch and the second wavelength selective switch are transmitted bidirectionally within a single optical transmission line. According to the optical transmission apparatus of the present invention, it is possible to add signal light having an arbitrary wavelength with respect to an arbitrary signal add port and drop signal light having an arbitrary wavelength from an arbitrary signal drop port, using a considerably reduced number of expensive wavelength selective switches (WSSs) and considerably reduced number of wirings for coupling the wavelength selective switches (WSSs), so as to enable the structure and size of the optical transmission apparatus to be simplified and reduced, respectively, while enabling to easily cope with an increase or decrease of the number of routes and an increase or decrease of the number of wavelengths (that is, channels).

Other objects and further features of the present invention will be apparent from the following detailed description when read in conjunction with the accompanying drawings.

DESCRIPTION OF THE PREFERRED EMBODIMENTS

Figure 3:
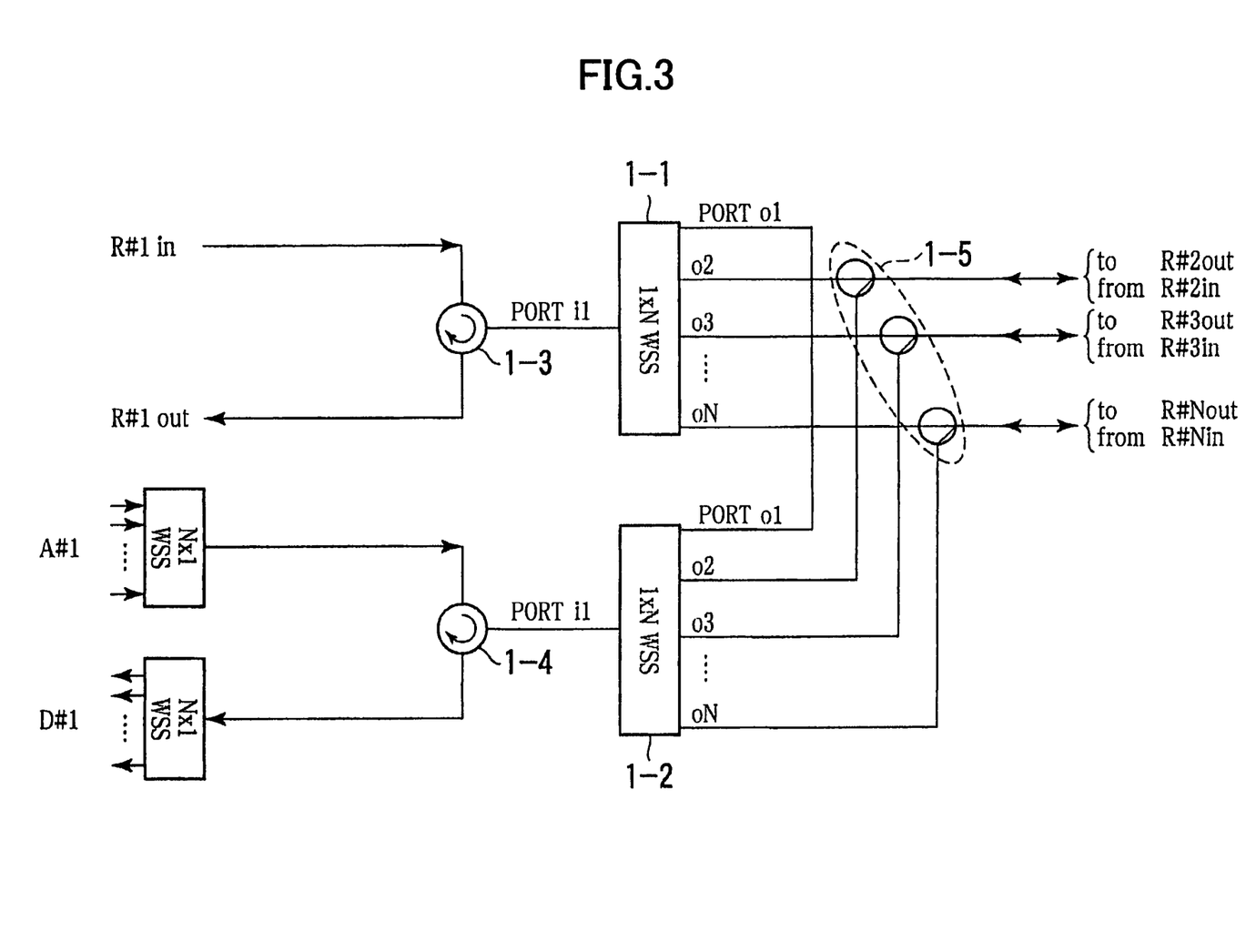
FIG. 3 is a system block diagram showing a structure of a first embodiment of an optical transmission apparatus according to the present invention for a portion including 1 route, 1 add port and 1 drop port.

FIG. 3 is a system block diagram showing a structure of a first embodiment of an optical transmission apparatus according to the present invention for a portion including 1 route R#1 and 1 add port A#1 and 1 drop port D#1. As shown in FIG. 3, a (1×N)-port wavelength selective switch (1×N_WSS) 1-1 for route switching is provided for selectively outputting the signal light from a first input route R#1in to second through Nth output routes R#2out through R#Nout, and for selectively outputting the signal lights from second through Nth input routes R#2in through R#Nin to a first output route R#1out for every wavelength.

In addition, a (1×N)-port wavelength selective switch (1×N_WSS) 1-2 for add and drop is provided for selectively outputting the signal light from a first add port A#1 to the first through Nth output routes R#1out through R#Nout for every wavelength, and for selectively outputting the signal lights from the first through Nth input routes R#1in through R#Nin to the first drop port D#1.

Further, an optical circulator 1-3 is provided in correspondence with the route R#1, for inputting the signal light from the first input route R#1in to the input port of the (1×N)-port wavelength selective switch (1×N_WSS) 1-1 for the route switching, and for outputting the signal light from the (1×N)-port wavelength selective switch (1×N_WSS) 1-1 to the first output route R#1out.

An optical circulator 1-4 for add and drop is provided for inputting the signal light from the first add port A#1 to the input port of the (1×N)-port wavelength selective switch (1×N_WSS) 1-2 for the add and drop, and for outputting the signal light from the (1×N)-port wavelength selective switch (1×N_WSS) 1-2 to the first drop port D#1.

Moreover, an optical coupler 1-5 is provided for multiplexing each of the signal lights output from the (1×N)-port wavelength selective switch (1×N_WSS) 1-1 to the second through Nth output routes R#2out through R#Nout and each of the signal lights from the (1×N)-port wavelength selective switch (1×N_WSS) 1-2 to the second through Nth output routes R#2out through R#Nout, for every route, and for branching and supplying each of the signal lights input from the second through Nth input routes R#2in through R#Nin to each of the ports o2 through oN of the (1×N)-port wavelength selective switches (1×N_WSSs) 1-1 and 1-2.

The signal lights that are input and output via the (1×N)-port wavelength selective switches (1×N_WSSs) 1-1 and 1-2 are transmitted and received bidirectionally via a single-core transmission line. For this reason, it is not possible to use the function of controlling the optical power for every wavelength in the (1×N)-port wavelength selective switches (1×N_WSSs) 1-1 and 1-2.

Figure 4:
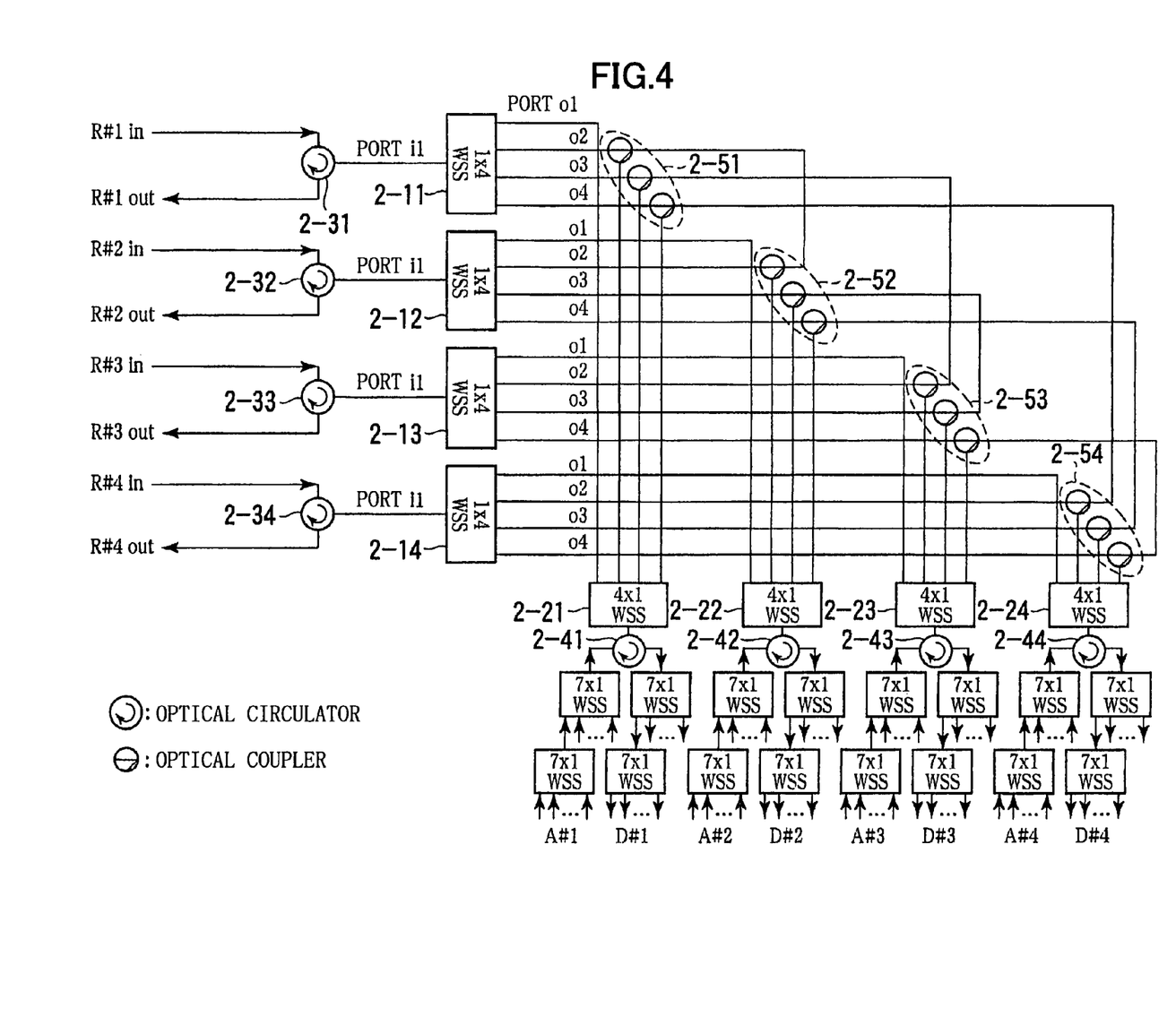
FIG. 4 is a system block diagram showing a structure of the first embodiment of the optical transmission apparatus for a portion including 4 routes.

FIG. 4 is a system block diagram showing a structure of the first embodiment of the optical transmission apparatus for a portion including 4 routes. FIG. 4 shows a case where the signal lights having 40 different wavelengths can be switched and sent to an arbitrary route of the 4 (N=4) routes for every wavelength. As shown in FIG. 4, (1×4)-port wavelength selective switches (1×4_WSSs) 2-11, 2-12, 2-13 and 2-14, corresponding to the (1×N)-port wavelength selective switch (1×N_WSS) 1-1, are provided in correspondence with the routes R#1 through R#4.

Of the 4 output ports o1, o2, o3 and o4 of each of the (1×4)-port wavelength selective switches (1×4_WSSs) 2-11, 2-12, 2-13 and 2-14, 3 output ports o2, o3 and o4 are connected to the other 3 (1×4)-port wavelength selective switches (1×4_WSSs) via optical couplers 2-51, 2-52, 2-53 and 2-54, and the remaining 1 output port o1 is connected to (4×1)-port wavelength selective switches (4×1_WSSs) 2-21, 2-22, 2-23 and 2-24.

Similarly to the optical coupler 1-5 shown in FIG. 3, each of the optical couplers 2-51, 2-52, 2-53 and 2-54 multiplexes the signal lights output from the (1×4)-port wavelength selective switch (1×4_WSS) for the route switching and the signal lights output from the (4×1)-port wavelength selective switch (4×1_WSS) for the add and drop, and outputs the multiplexed signal lights. In addition, each of the optical couplers 2-51, 2-52, 2-53 and 2-54 corresponding to one route inputs and drops the signal light output from the (1×4)-port wavelength selective switch (1×4_WSS) of another route, and outputs the dropped signal light to the ports of the (1×4)-port wavelength selective switch (1×4_WSS) and the (4×1)-port wavelength selective switch (1×4_WSS) corresponding to the one route.

In addition, similarly to the optical circulator 1-3 shown in FIG. 3, each of the optical circulators 2-31, 2-32, 2-33 and 2-34 inputs the signal light from the corresponding one of the input routes R#1in, R#2in, R#3in and R#4in to the input port of the corresponding one of the (1×4)-port wavelength selective switches (1×4_WSSs) 2-11, 2-12, 2-13 and 2-14, and outputs the signal light from the corresponding one of the (1×4)-port wavelength selective switches (1×4_WSSs) 2-11, 2-12, 2-13 and 2-14 to the corresponding one of the output routes R#1out, R#2out, R#3out and R#4out.

The (4×1)-port wavelength selective switches (4×1_WSSs) 2-21, 2-22, 2-23 and 2-24 are respectively connected to the add ports A#1 through A#4 and to the drop ports D#1 through D#4, via the optical circulators 2-41, 2-42, 2-43 and 2-44. The add ports A#1 through A#4 respectively have transmitters TX (not shown) for sending signal lights having 40 different wavelengths. The drop ports D#1 through D#4 respectively have receivers RX (not shown) for receiving signal lights having 40 different wavelengths.

In a case where the transmitters TX are variable wavelength transmitters or the receivers RX are variable wavelength receivers, the 40 variable wavelength transmitters TX or the 40 variable wavelength receivers RX are connected to the corresponding one of the optical circulators 2-41, 2-42, 2-43 and 2-44 via a wavelength selective means (or a wavelength selective part) formed by (7×1)-port wavelength selective switches (7×1_WSSs) that are connected in 2 stages.

On the other hand, in a case where the transmitters TX are fixed wavelength transmitters or the receivers RX are fixed wavelength transmitters, an optical coupler is used to couple the output signal lights of the fixed wavelength transmitters TX that send the signal lights amounting to 40 wavelengths or to couple the input signal lights of the fixed wavelength receivers RX that receive the signal lights amounting to 40 wavelengths, so as to connect the fixed wavelength transmitters TX or the fixed wavelength receivers RX to the corresponding one of the optical circulators 2-41, 2-42, 2-43 and 2-44 via the optical coupler.

Figure 5:
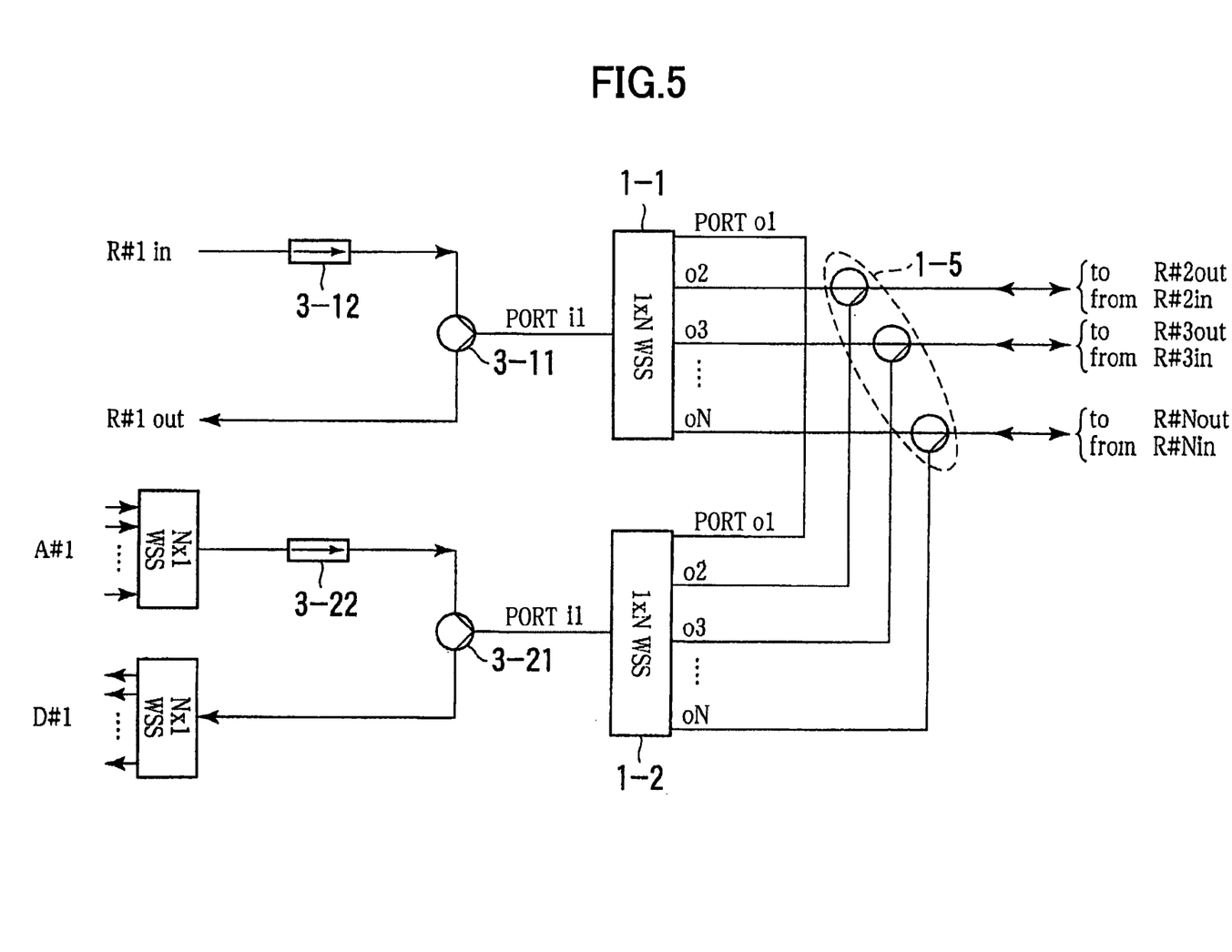
FIG. 5 is a system block diagram showing a structure of a second embodiment of the optical transmission apparatus according to the present invention for a portion including 1 route, 1 add port and 1 drop port.
Figure 6:
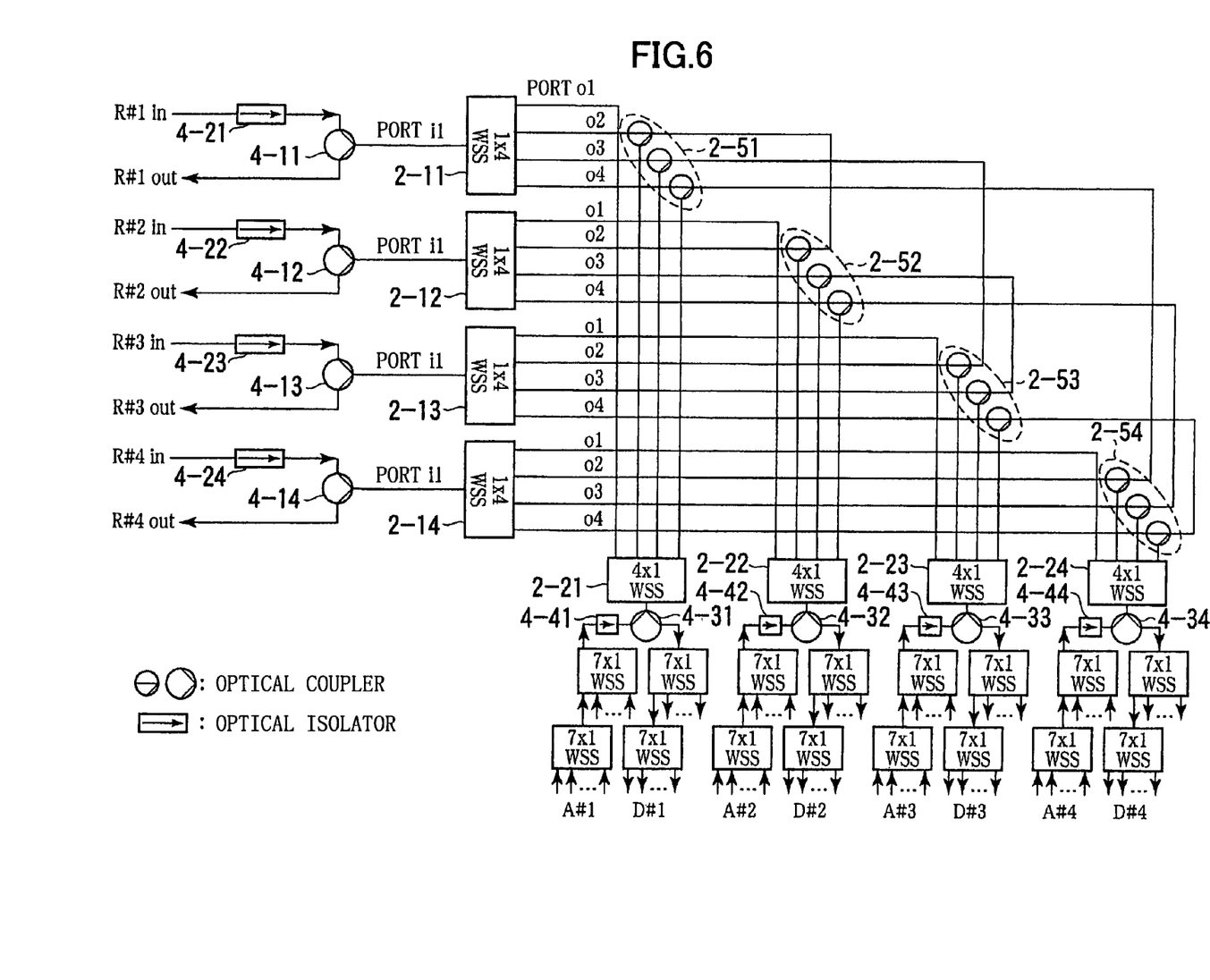
FIG. 6 is a system block diagram showing a structure of the second embodiment of the optical transmission apparatus for a portion including 4 routes.

Next, a description will be given of a second embodiment of the optical transmission apparatus according to the present invention, by referring to FIGS. 5 and 6. FIG. 5 is a system block diagram showing a structure of the second embodiment of the optical transmission apparatus for a portion including 1 route, 1 add port and 1 drop port. FIG. 5 shows a case where a 2×1 optical coupler and an optical isolator are respectively used in place of the optical circulator 1-3 corresponding to the route and the optical circulator 1-4 for the add and drop, so as to realize functions equivalent to those of the optical circulator 1-3 and the optical circulator 1-4. FIG. 6 is a system block diagram showing a structure of the second embodiment of the optical transmission apparatus for a portion including 4 routes. FIG. 6 shows a case where the signal lights having 40 different wavelengths can be switched and sent to an arbitrary route of the 4 (N=4) routes for every wavelength.

As shown in FIG. 5, an optical coupler 3-11 is provided in correspondence with the first route R#1, for inputting the signal light from the first input route R#1in to the input port of the (1×N)-port wavelength selective switch (1×N_WSS) 1-1 for the route switching, and for branching and outputting the signal light from the (1×N)-port wavelength selective switch (1×N_WSS) 1-1 to the first input route R#1in and the first output route R#1out.

An optical isolator 3-12 is provided in the first input route R#1in, to pass the signal light input from the first input route R#1in to the optical coupler 3-11 but to block the signal light from the optical coupler 3-11 from being input to the first input route R#1in. Accordingly, the signal light from the first input route R#1in is input to the input port of the (1×N)-port wavelength selective switch (1×N_WSS) 1-1, and the signal light from the (1×N)-port wavelength selective switch (1×N_WSS) 1-1 is output only to the first output route R#1out.

In addition, an optical coupler 3-12 for adding and dropping inputs the signal light from the first add port A#1 to the input port of a (1×N)-port wavelength selective switch (1×N_WSS) 1-2 for adding and dropping. The optical coupler 3-12 also drops and outputs the signal light from the (1×N)-port wavelength selective switch (1×N_WSS) 1-2 to the first add port A#1 and the first drop port D#1.

An optical isolator 3-32 is provided in the optical transmission line to the first add port A#1. The optical isolator 3-32 passes the signal light input from the first add port A#1 to the optical coupler 3-21, but to block the signal light from the optical coupler 3-12 from being input to the first add port A#1. Hence, the signal light from the first add port A#1 is input to the input port of the (1×N)-port wavelength selective switch (1×N_WSS) 1-2, and the signal light from the (1×N)-port wavelength selective switch (1×N_WSS) 1-2 is output only to the first drop port D#1.

The optical couplers 4-11 through 4-14 and the optical isolators 4-21 through 4-24 shown in FIG. 6 replace the optical circulators 2-31 through 2-34 corresponding to the routes shown in FIG. 4. Moreover, the optical couplers 4-31 through 3-34 and the optical isolators 4-41 through 4-44 shown in FIG. 6 replace the optical circulators 2-41 through 2-44 for the add and drop shown in FIG. 4. Otherwise, the structure shown in FIG. 6 is the same as the structure shown in FIG. 4.

According to either one of the structures shown in FIGS. 4 and 6, when increasing or decreasing the number of wavelengths (that is, channels), it is sufficient to simply increase or decrease the number of ports of the (1×4)-port wavelength selective switches (1×4_WSS) 2-11 through 2-14 corresponding to the routes and the number of ports of the (4×1)-port wavelength selective switches (4×1_WSS) 2-21 through 2-24 for the add and drop.

Of course, modifications of the structures of the optical transmission apparatuses shown in FIGS. 3 through 6 are possible. For example, the optical circulators in correspondence with each of the routes and the optical circulators for the add and drop may be partially replaced by a combination of an optical coupler and an optical isolator. In addition, it is possible to use elements equivalent to the optical circulator and the optical coupler for such a combination.

FIGS. 7 through 12 are diagrams for explaining differences in the performances of the optical transmission apparatus according to the present invention and the conceivable optical transmission apparatus. More particularly, FIGS. 7 through 12 show the performances of the first or second embodiment of the optical transmission apparatus shown in FIG. 4 or 6 and the conceivable optical transmission apparatus shown in FIG. 2. For the sake of convenience, FIGS. 7 through 12 show the route switching function and the add and drop functions with respect to the signal light for the first route R#1.

Figure 7:
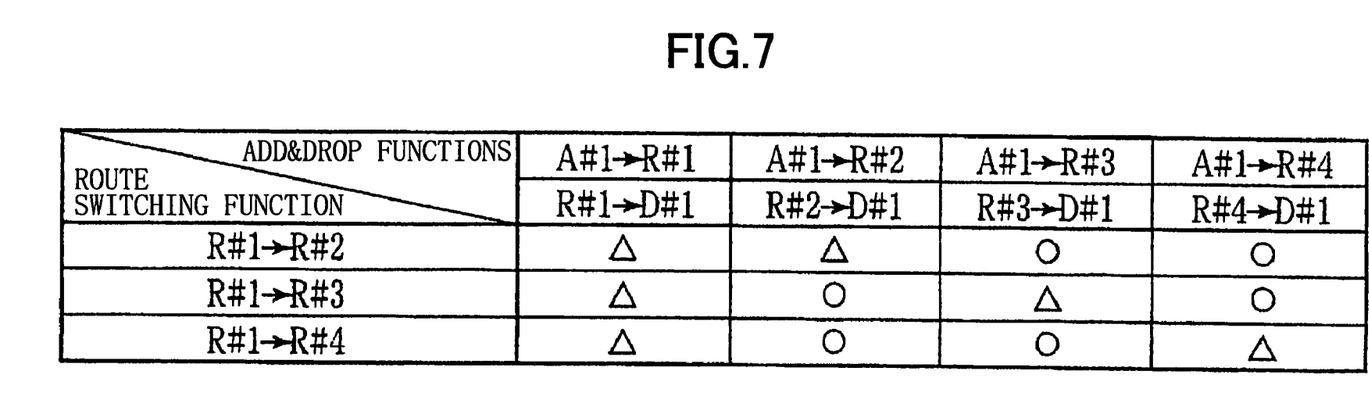
FIGS. 7 through 12 are diagrams for explaining differences in the performances of the optical transmission apparatus according to the present invention and the conceivable optical transmission apparatus.

For example, a symbol "Δ" in a box at the intersection of the route switching function "R#1→R#2" for switching to another route and the add and drop functions "A#1→R#1, R#1→D#1" in FIG. 7 indicates that one of the route switching function "R#1→R#2" and the add and drop functions "A#1→R#1, R#1→D#1" is executable. The symbol "Δ" is used similarly in FIGS. 7 through 12.

In addition, a symbol "o" in a box at the intersection of the route switching function "R#1→R#2" for switching to another route and the add and drop functions "A#1→R#1, R#1→D#1" in FIG. 7 indicates that both the route switching function "R#1→R#2" and the add and drop functions "A#1→R#1, R#1→D#1" are executable. The symbol "o" is used similarly in FIGS. 7 through 12.

When the route switching function to switch from the first route R#1 to the second route R#2 is carried out in the conceivable optical transmission apparatus shown in FIG. 2, the signal light having the same wavelength as the target signal light is output only to the second output wavelength selective switch (4×1 WSS) from the first input wavelength selective switch (1×4_WSS), and thus, the signal light cannot be dropped at any of the drop ports. In other words, the route switching function "R#1→R#2" and the drop function "R#1→D#1" cannot be carried out simultaneously for the same wavelength, and only one of the functions can be carried out at one time. The same holds true for the case where the route switching function "R#1→R#3" and the route switching function "R#1→R#4" are carried out.

Furthermore, when the route switching function to switch from the first route R#1 to the second route R#2 is carried out in the conceivable optical transmission apparatus shown in FIG. 2, the signal light having the same wavelength as the target signal light cannot be added by the first add port A#1 to the second route R#2. Similarly, the signal light having the same wavelength as the target signal light cannot be added by the first add port A#1 to the third route R#3 when the route switching function to switch from the first route R#1 to the third route R#3 is carried out in the conceivable optical transmission apparatus shown in FIG. 2. In addition, the signal light having the same wavelength as the target signal light cannot be added by the first add port A#1 to the fourth route R#4 when the route switching function to switch from the first route R#1 to the fourth route R#4 is carried out in the conceivable optical transmission apparatus shown in FIG. 2.

Accordingly, the functions that are not simultaneously realizable in the conceivable optical transmission apparatus shown in FIG. 2 are indicated in FIG. 7 by the symbol "Δ" in each box at the intersection of such functions. Other combinations of the functions that are simultaneously realizable are indicated by the symbol "o" in each box at the intersection of such functions. For example, when the route switching function to switch from the first route R#1 to the second route R#2 is carried out, the signal light having any wavelength can be added by the first add port A#1 to the third route R#3, and the signal light having any wavelength can be dropped from the third route R#3 to the first drop port D#1, as indicated by the symbol "o".

Figure 8:
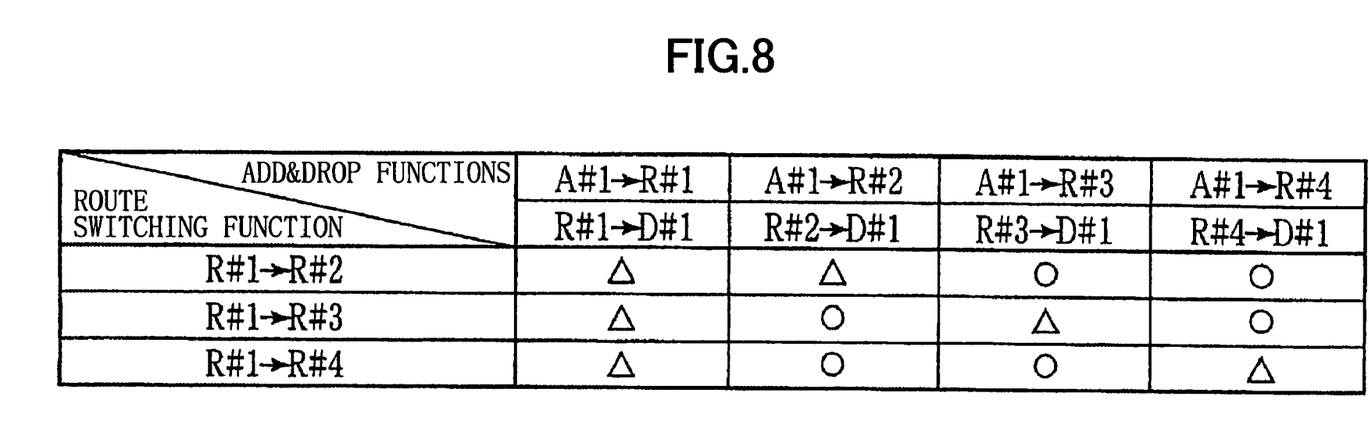

On the other hand, FIG. 8 shows the route switching function and the add and drop functions of the first or second embodiment of the optical transmission apparatus shown in FIG. 4 or 6. As may be seen from a comparison of FIGS. 7 and 8, the functions of the optical transmission apparatus according to the present invention will not deteriorate compared to the functions of the conceivable optical transmission apparatus shown in FIG. 2. More particularly, the functions of the optical transmission apparatus according to the present invention are improved compared to the functions of the conceivable optical transmission apparatus shown in FIG. 2, as shown in FIGS. 9 through 12.

Figure 9:
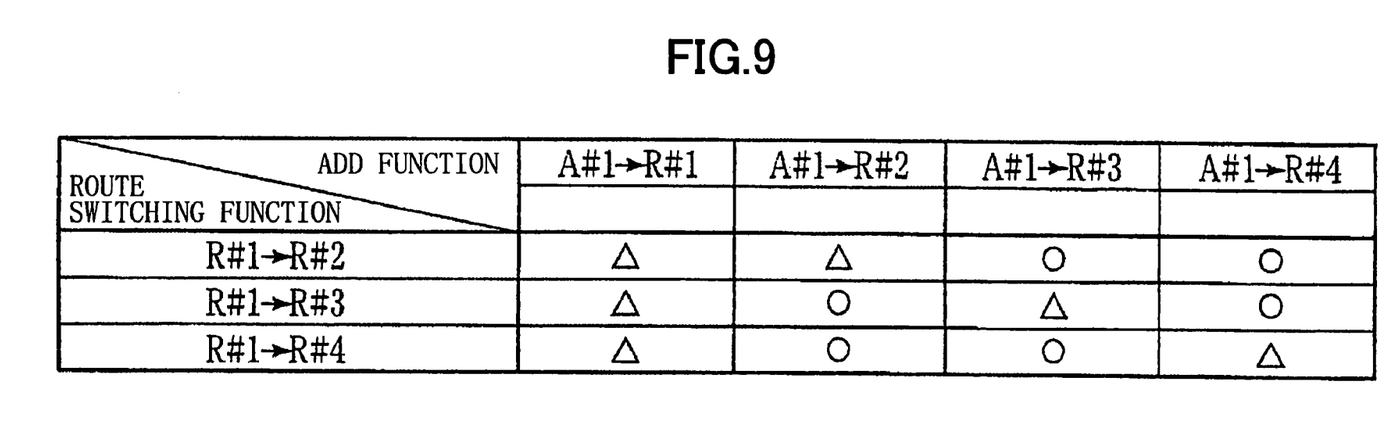
Figure 10:
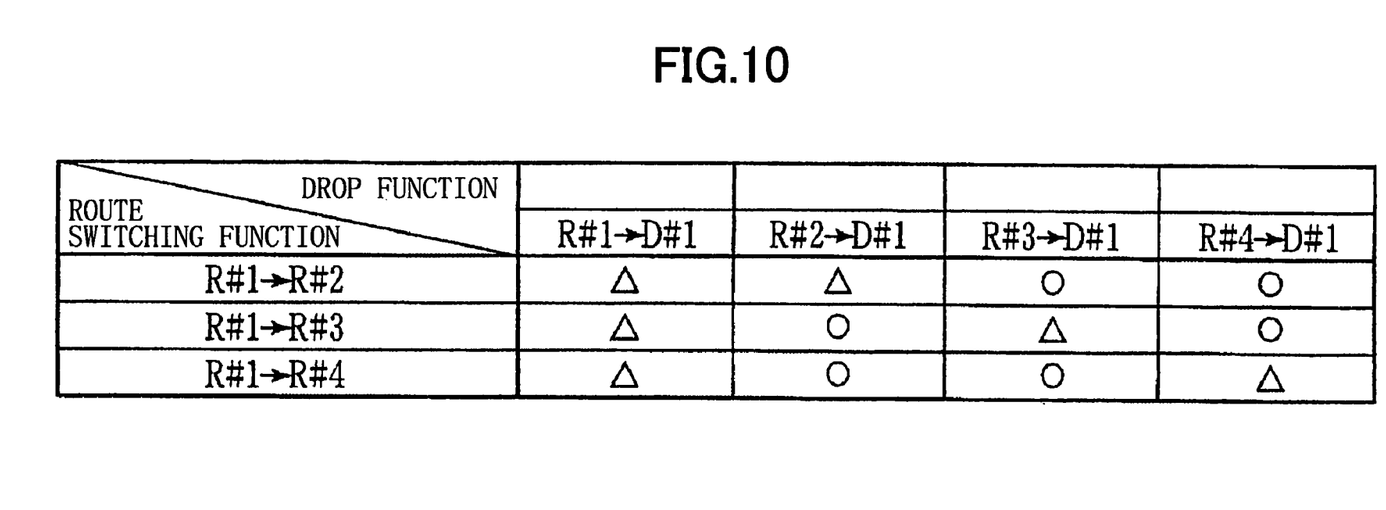
Figure 11:
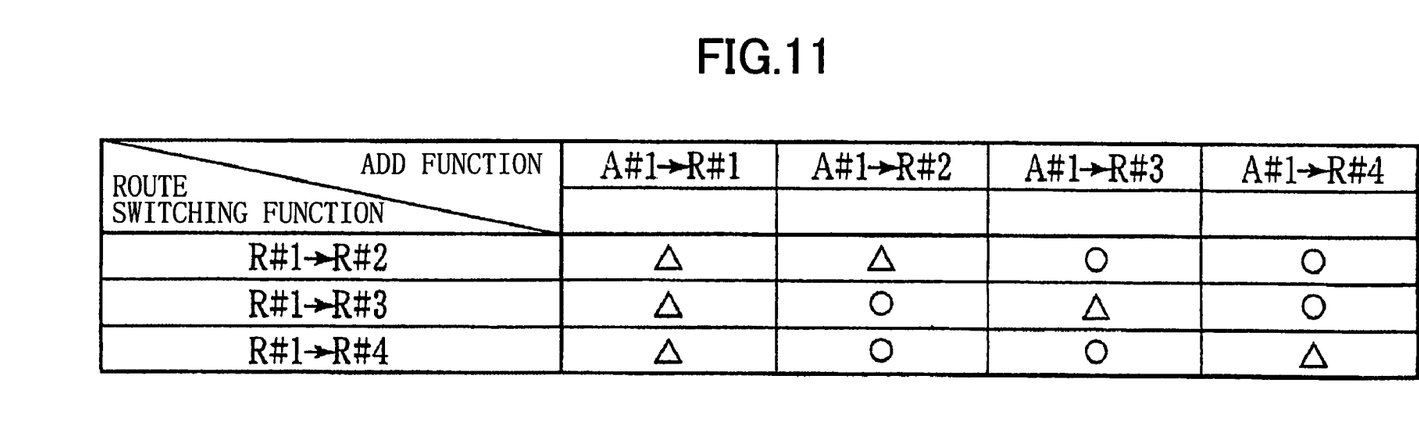
Figure 12:
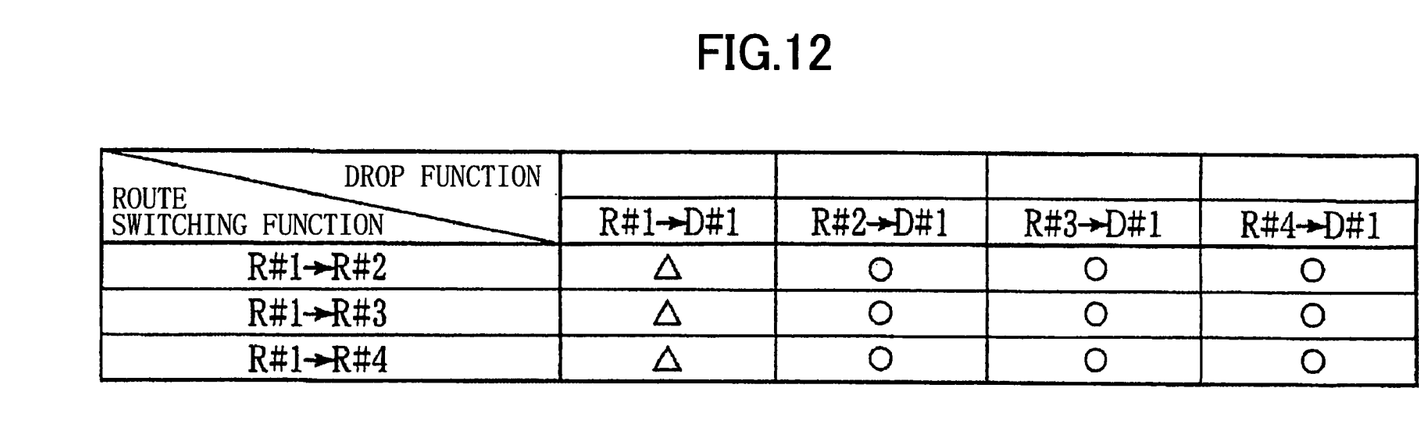

FIGS. 9 through 12 show the add and drop functions shown in FIGS. 7 and 8 separately for the add function and the drop function. FIG. 9 shows the route switching function and the add function of the conceivable optical transmission apparatus shown in FIG. 2, and FIG. 10 shows the route switching function and the drop function of the conceivable optical transmission apparatus shown in FIG. 2. FIG. 11 shows the route switching function and the add function of the first or second embodiment of the optical transmission apparatus shown in FIG. 4 or 6, and FIG. 12 shows the route switching function and the drop function of the first or second embodiment of the optical transmission apparatus shown in FIG. 4 or 6.

Next, a description will be given of the differences in the functions of the conceivable optical transmission apparatus shown in FIG. 2 and the first or second embodiment of the optical transmission apparatus shown in FIG. 4 or 6, by referring to FIGS. 9 through 12.

First, a description will be given of the add function of the conceivable optical transmission apparatus. As shown in FIG. 9, when the route switching function to switch from the first route R#1in to the second route R#2out is carried out in the conceivable optical transmission apparatus, the signal light having the same wavelength as the target signal light cannot be added by the first add port A#1 to the second route R#2out.

In addition, when the route switching function to switch from the first route R#1in to the second route R#2out is carried out, the route switching function to switch from the second route R#2in to the first route R#1out is also carried out because the bidirectional communication is made. For this reason, the signal light having the same wavelength as the signal light used by the route switching function that switches from the second route R#2in to the first route R#1out cannot be added by the first add port A#1 to the first route R#1out.

Similarly, when the route switching function to switch from the first route R#1in to the third route R#3out is carried out, the signal light cannot be added by the first add port A#1 to the first route R#1out and the signal light cannot be added by the first add port A#1 to the third route R#3out, because there is a possibility that a collision will occur between the signal lights having the same wavelength. Therefore, the add function cannot be carried out for an arbitrary wavelength.

Furthermore, when the route switching function to switch from the first route R#1in to the fourth route R#4out is carried out, the signal light cannot be added by the first add port A#1 to the first route R#1out and the signal light cannot be added by the first add port A#1 to the fourth route R#4out, because there is a possibility that a collision will occur between the signal lights having the same wavelength. Therefore, the add function cannot be carried out for an arbitrary wavelength. Consequently, the route switching function and the add function that are possible become as shown in FIG. 9.

Next, a description will be given of the drop function of the conceivable optical transmission apparatus. As shown in FIG. 10, when the route switching function to switch from the first route R#1in to the second route R#2out is carried out in the conceivable optical transmission apparatus, the signal light having the same wavelength as the target signal light is only output to the second output wavelength selective switch (4×1_WSS) from the first input wavelength selective switch (1×7_WSS) and cannot be dropped by any drop port. In other words, the route switching function "R#1→R#2" and the drop function "R#1→D#1" cannot be carried out simultaneously for the same wavelength, and only one of the route switching function and the drop function can be carried out at one time.

In addition, when the route switching function to switch from the first route R#1in to the second route R#2out is carried out, the route switching function to switch from the second route R#2in to the first route R#1out is also carried out because the bidirectional communication is made. For this reason, the signal light having the same wavelength as the signal light used by the route switching function that switches from the second route R#2in to the first route R#1out cannot be dropped from the second route R#2in by the first drop port D#1.

Similarly, when the route switching function to switch from the first route R#1in to the third route R#3out is carried out, the signal light cannot be dropped from the first route R#1in by first drop port D#1 and the signal light cannot be dropped from the third route R#3in by the first drop port D#1. Therefore, the drop function cannot be carried out for an arbitrary wavelength.

Furthermore, when the route switching function to switch from the first route R#1in to the fourth route R#4out is carried out, the signal light cannot be dropped from the first route R#1in by the first drop port D#1 and the signal light cannot be dropped from the fourth route R#4in by the first drop port D#1. Therefore, the drop function cannot be carried out for an arbitrary wavelength. Consequently, the route switching function and the drop function that are possible become as shown in FIG. 10.

Next, a description will be given of the add function of the first or second embodiment of the optical transmission apparatus. As shown in FIG. 11, when the route switching function to switch from the first route R#1in to the second route R#2out is carried out in the first or second embodiment of the optical transmission apparatus, the signal light having the same wavelength as the target signal light cannot be added by the first add port A#1 to the second route R#2out.

In addition, when the route switching function to switch from the first route R#1in to the second route R#2out is carried out, the route switching function to switch from the second route R#2in to the first route R#1out is also carried out because the bidirectional communication is made. For this reason, the signal light having the same wavelength as the signal light used by the route switching function that switches from the second route R#2in to the first route R#1out cannot be added by the first add port A#1 to the first route R#1out.

Similarly, when the route switching function to switch from the first route R#1in to the third route R#3out is carried out, the signal light cannot be added by the first add port A#1 to the first route R#1out and the signal light cannot be added by the first add port A#1 to the third route R#3out, because there is a possibility that a collision will occur between the signal lights having the same wavelength. Therefore, the add function cannot be carried out for an arbitrary wavelength.

Furthermore, when the route switching function to switch from the first route R#1in to the fourth route R#4out is carried out, the signal light cannot be added by the first add port A#1 to the first route R#1out and the signal light cannot be added by the first add port A#1 to the fourth route R#4out, because there is a possibility that a collision will occur between the signal lights having the same wavelength. Therefore, the add function cannot be carried out for an arbitrary wavelength. Consequently, the route switching function and the add function that are possible become as shown in FIG. 11.

Next, a description will be given of the drop function of the first or second embodiment of the optical transmission apparatus. As shown in FIG. 12, when the route switching function to switch from the first route R#1in to the second route R#2out is carried out in the first or second embodiment of the optical transmission apparatus, the signal light having the same wavelength as the target signal light is output to the second output wavelength selective switch (1×4_WSS) from the first input wavelength selective switch (1×4_WSS) and can be dropped by the second drop port D#2, but cannot be dropped by the first drop port D#1.

However, when the route switching function to switch from the first route R#1in to the second route R#2out is carried out, the route switching function to switch from the second route R#2in to the first route R#1out is also carried out because the bidirectional communication is made. For this reason, the signal light from the second route R#2in to the first route R#1out can be dropped by the first drop port D#1 via the optical coupler 2-51.

Similarly, when the route switching function to switch from the first route R#1in to the third route R#3out is carried out, the signal light having the same wavelength as the target signal light is output to the third output wavelength selective switch (1×4_WSS) from the first input wavelength selective switch (1×4_WSS) and can be dropped by the third drop port D#3, but cannot be dropped by the first drop port D#1.

However, when the route switching function to switch from the first route R#1in to the third route R#3out is carried out, the route switching function to switch from the third route R#3in to the first route R#1out is also carried out because the bidirectional communication is made. For this reason, the signal light from the third route R#3 in to the first route R#1out can be dropped by the first drop port D#1 via the optical coupler 2-51.

Similarly, when the route switching function to switch from the first route R#1in to the fourth route R#4out is carried out, the signal light having the same wavelength as the target signal light is output to the fourth output wavelength selective switch (1×4_WSS) from the first input wavelength selective switch (1×4_WSS) and can be dropped by the fourth drop port D#4, but cannot be dropped by the first drop port D#1.

However, when the route switching function to switch from the first route R#1in to the fourth route R#4out is carried out, the route switching function to switch from the fourth route R#4in to the first route R#1out is also carried out because the bidirectional communication is made. For this reason, the signal light from the fourth route R#4in to the first route R#1out can be dropped by the first drop port D#1 via the optical coupler 2-51. Consequently, the route switching function and the drop function that are possible become as shown in FIG. 12.

Accordingly, the combination of the functions shown in FIGS. 9 and 10 are shown in FIG. 7 for the conceivable optical transmission apparatus, and the combination of the functions shown in FIGS. 11 and 12 are shown in FIG. 8 for the first or second embodiment of the optical transmission apparatus according to the present invention. From a comparison of FIGS. 7 and 8, there are no differences between the functions simultaneously executable in the conceivable optical transmission apparatus and the first or second embodiment of the optical transmission apparatus. However, it may be seen from a comparison of FIGS. 10 and 12 that the drop function of the first or second embodiment of the optical transmission apparatus is expanded compared to the drop function of the conceivable optical transmission apparatus.

Therefore, according to the optical transmission apparatus of the present invention, it is possible to considerably reduce the number of wavelength selective switches that amount to approximately half the hardware of the conceivable optical transmission apparatus. It is also possible to use an optical coupler, an optical circulator, an optical isolator and the like, which are inexpensive compared to the wavelength selective switch, to thereby enable the cost of the optical transmission apparatus to be reduced by approximately 50% compared to the conceivable optical transmission apparatus.

This application claims the benefit of a Japanese Patent Application No. 2006-233401 filed Aug. 30, 2006, in the Japanese Patent Office, the disclosure of which is hereby incorporated by reference.

Further, the present invention is not limited to these embodiments, but various variations and modifications may be made without departing from the scope of the present invention.

What is claimed is:

1. An optical transmission apparatus comprising:
   a first wavelength selective switch for route switching, configured to selectively output signal light from a first input route to second through Nth output routes and to selectively output signal lights from second through Nth input routes to a first output route, depending on wavelength;
   a second wavelength selective switch for add and drop, configured to selectively output a signal light from an add port to the second through Nth output routes, and to the first output route via the first wavelength selective switch, depending on wavelength, and to selectively output the signal lights from the second through Nth input routes to a drop port and the signal light from the first input route to the drop part via the first wavelength selective switch, depending on wavelength; and an optical coupler configured to multiplex each of the signal lights output from the first wavelength selective switch to the second through Nth output routes and a corresponding one of the signal lights output from the second wavelength selective switch to the second through Nth output routes, and to send multiplexed signal light to another wavelength selective switch that is different from said first and second wavelength selective switches via one of the second through Nth output routes, and to branch and supply multiplexed signal light input from said second through Nth input routes to the first wavelength selective switch and the second wavelength selective switch, wherein the signal lights input and output by the first wavelength selective switch transmitted bidirectionally within a single optical transmission line and the signal lights input and output by the second wavelength selective switch are transmitted bidirectionally within a single optical transmission line.

2. The optical transmission apparatus as claimed in claim 1, further comprising:

an optical circulator provided with respect to the first input route and the first output route, configured to input the signal light from the first input route to the first wavelength selective switch, and to output the signal lights from the first wavelength selective switch to the first output route.

3. The optical transmission apparatus as claimed in claim 1, further comprising:

an optical circulator for add and drop, configured to input the signal light from the add port to the second wavelength selective switch, and to output the signal lights from the second wavelength selective switch to the drop port.

4. The optical transmission apparatus as claimed in claim 1, further comprising:

an optical isolator configured to input the signal light from the first input route to the first wavelength selective switch, and to block other signal light from the first wavelength selective switch from being output to the first input route; and an optical coupler configured to input the signal light from the first input route via the optical isolator to the first wavelength selective switch, and to branch and output the signal lights from the first wavelength selective switch to the optical isolator and the first output route.

5. The optical transmission apparatus as claimed in claim 1, further comprising:

an optical isolator configured to input the signal light from the add port to the second wavelength selective switch, and to block other signal light from the second wavelength selective switch from being output to the add port; and an optical coupler configured to input the signal light from the add port via the optical isolator to the second wavelength selective switch, and to branch and output the signal lights from the second wavelength selective switch to the the optical isolator and the drop port.

* * * * *